(12) United States Patent
Shemberger

(10) Patent No.: US 6,195,847 B1
(45) Date of Patent: Mar. 6, 2001

(54) HAT/TIE CLIP ACCESSORY

(76) Inventor: James W. Shemberger, 10366 N. 48th St., Battle Creek, MI (US) 49017

( * ) Notice: Subject to any disclaimer, the term of this patent is extended or adjusted under 35 U.S.C. 154(b) by 0 days.

(21) Appl. No.: 09/263,558

(22) Filed: Mar. 8, 1999

Related U.S. Application Data

(60) Provisional application No. 60/078,039, filed on Mar. 16, 1998.

(51) Int. Cl.[7] .............................. A01K 83/00; A45F 5/02
(52) U.S. Cl. .................... 24/66.13; 24/66.11; 24/163 K; 24/908; 43/42.43
(58) Field of Search .............................. 24/66.13, 66.11, 24/66.12, 6, 13, 716, 908, 599.6, 66.2

(56) References Cited

U.S. PATENT DOCUMENTS

| | | | |
|---|---|---|---|
| 2,206,486 | * 7/1940 | Nelson | 43/42.43 |
| 2,756,478 | * 7/1956 | Morrissey | 24/908 |
| 3,640,014 | * 2/1972 | Gurka | 43/42.43 |
| 4,277,863 | * 7/1981 | Faneuf | 24/312 |
| 4,715,839 | * 12/1987 | Ford et al. | 24/163 K |
| 4,803,798 | * 2/1989 | Hannah | 43/43.13 |
| 5,081,785 | * 1/1992 | Kahng | 24/908 |
| 5,829,103 | * 11/1998 | Allen | 24/3.12 |
| 5,890,638 | * 4/1999 | Woloshen | 224/247 |

* cited by examiner

*Primary Examiner*—Victor N. Sakran

(57) ABSTRACT

The invention is directed to a combination of a bent fishhook and a miniature sports item, the shaft of the fishhook formed by bending back to form a gripping space for gripping a flat object, a section of the barbed point being cut off and the remaining section being bent up at 90°. A miniature sports item being pivotally mounted on the barbed point by inserting the barbed point within a hole formed in the bottom of the sports item. The sports item may be a race car, a golf bag, etc.

4 Claims, 8 Drawing Sheets

HAT/TIE CLIP ACCESSORY

This is a Continuation of Provisional Application Ser. No. 60/078,039, filed Mar. 16, 1998.

BACKGROUND OF THE INVENTION

1. Field of the Invention

The invention relates to a novelty item, and more specifically, the invention relates to a combination of two existing objects, a bent fishing hook, and a miniature die cast racing car to form a hat or tie clip.

SUMMARY OF THE INVENTION

The invention consists of a miniature racing car mounted on a modified, bent fishing hook, which is sold as a tie clip. The instant invention is sized to conveniently fit on the bill of a baseball cap. The fishhook is modified by bending the barb upwardly at 90° and cutting off part of the barbed tip. An existing hole on the bottom of the racing car is modified slightly to accept and hold the modified barb and thereby keeping the race car in a position to rotate around the barbed end when desired.

DETAILED DESCRIPTION OF THE PREFERRED EMBODIMENTS

Figure 1:
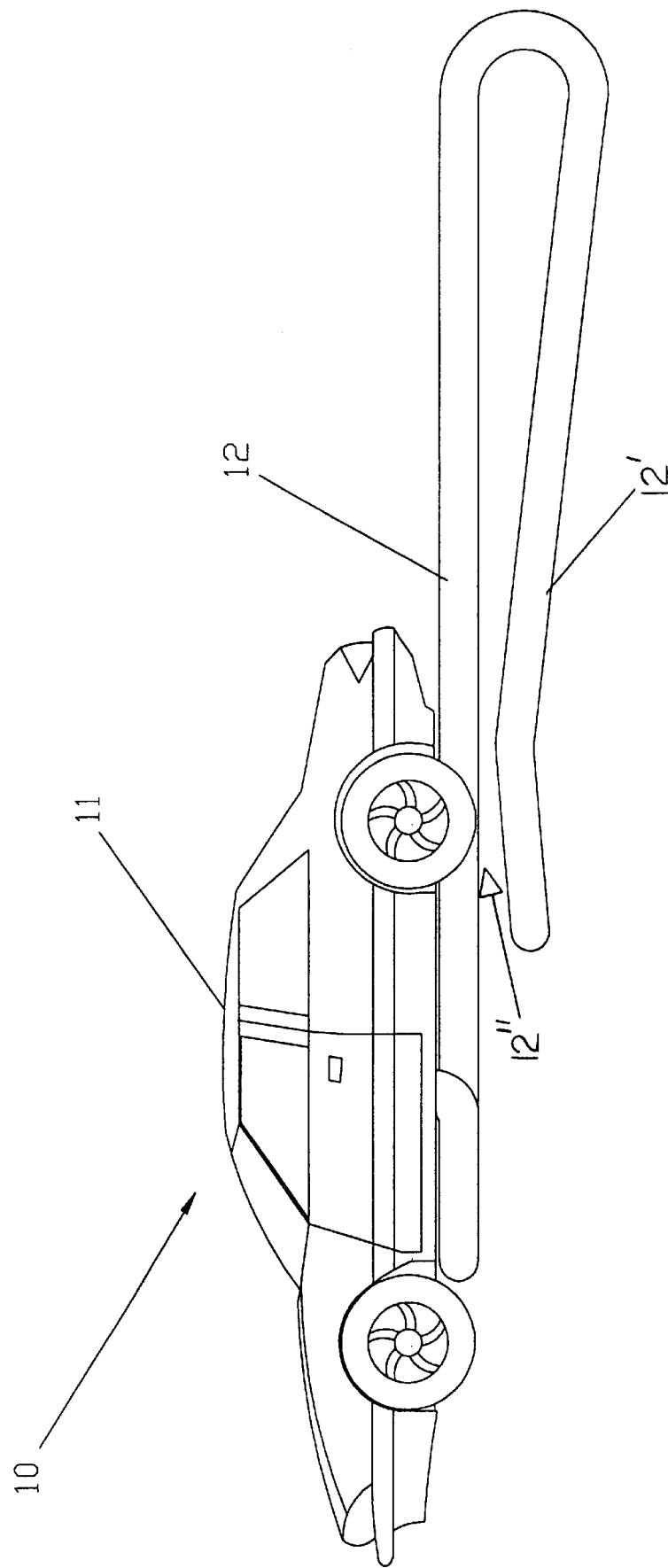
FIG. 1. is a side, perspective view of a miniature die cast racing car mounted on a bent fishing hook in accordance with the invention.

Referring now to FIG. 1, there is shown a side perspective view of the hat/tie clip accessory of the invention indicated generally by the numeral 10. A miniature race car 11 is shown mounted on a bent fishhook 12 in accordance with the invention.

Figure 2:
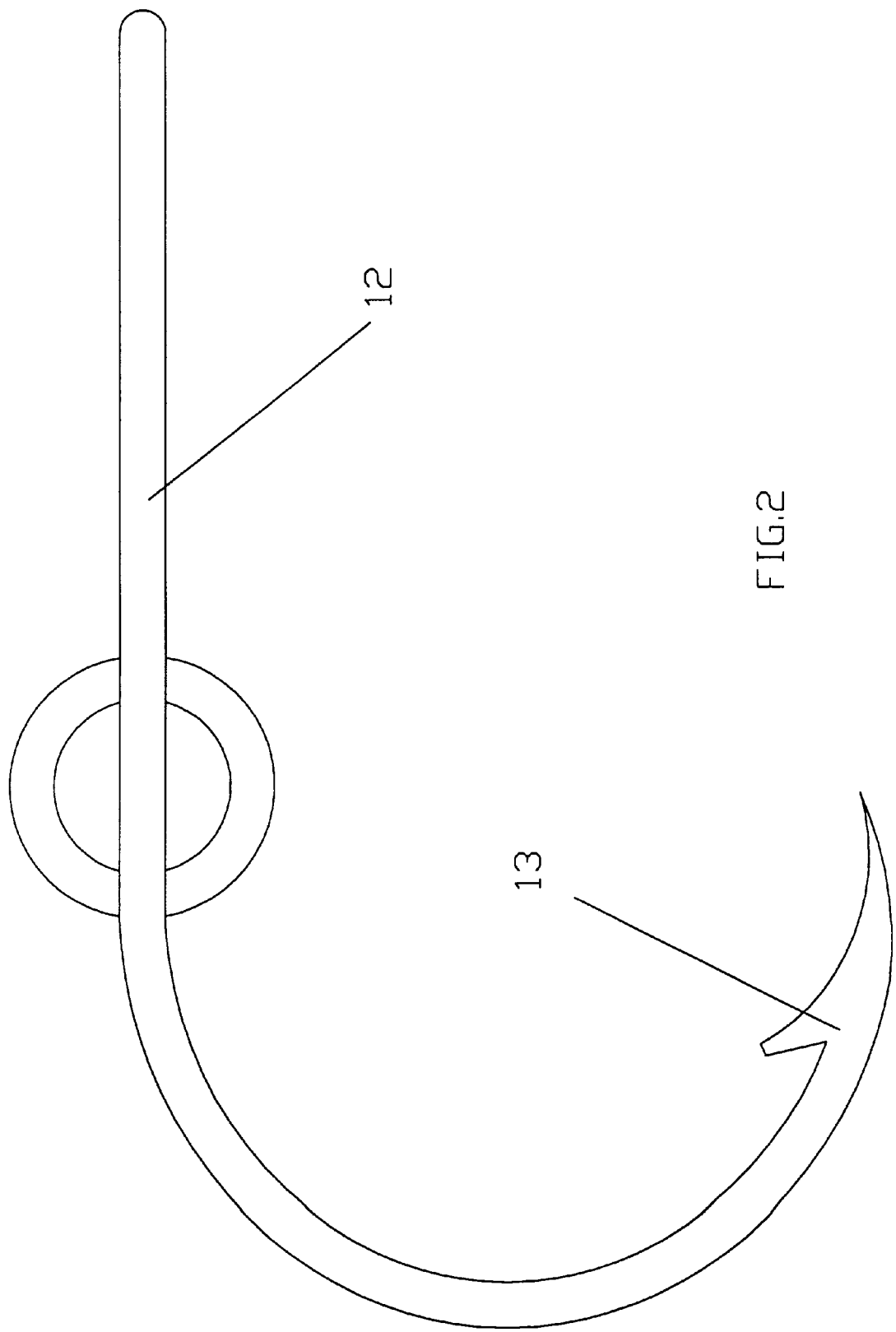
FIG. 2. is a top perspective view of a bent fishing hook in accordance with the invention.
Figure 3:
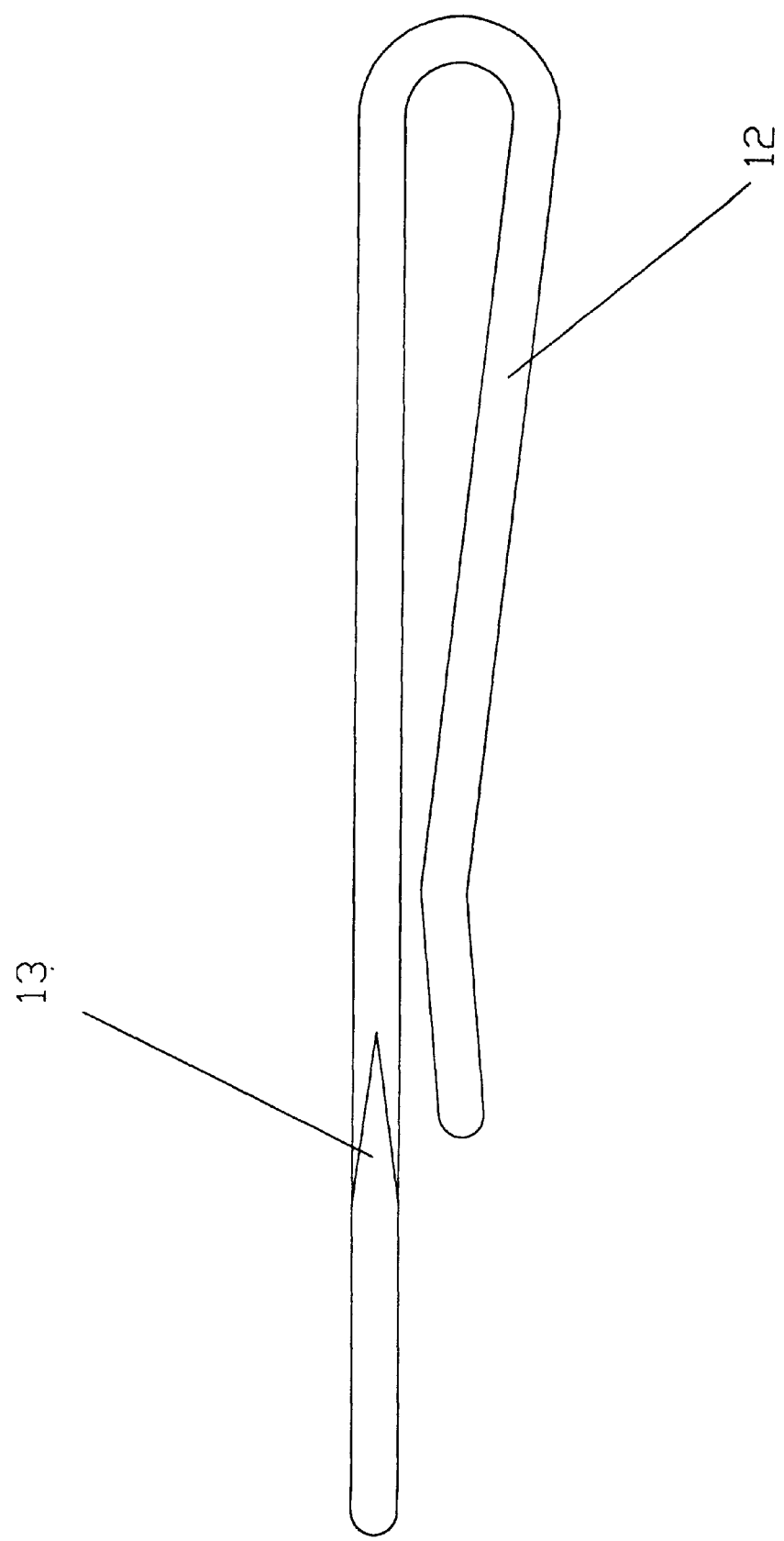
FIG. 3. is a side perspective view of a bent fishing hook in accordance with the invention.
Figure 4:
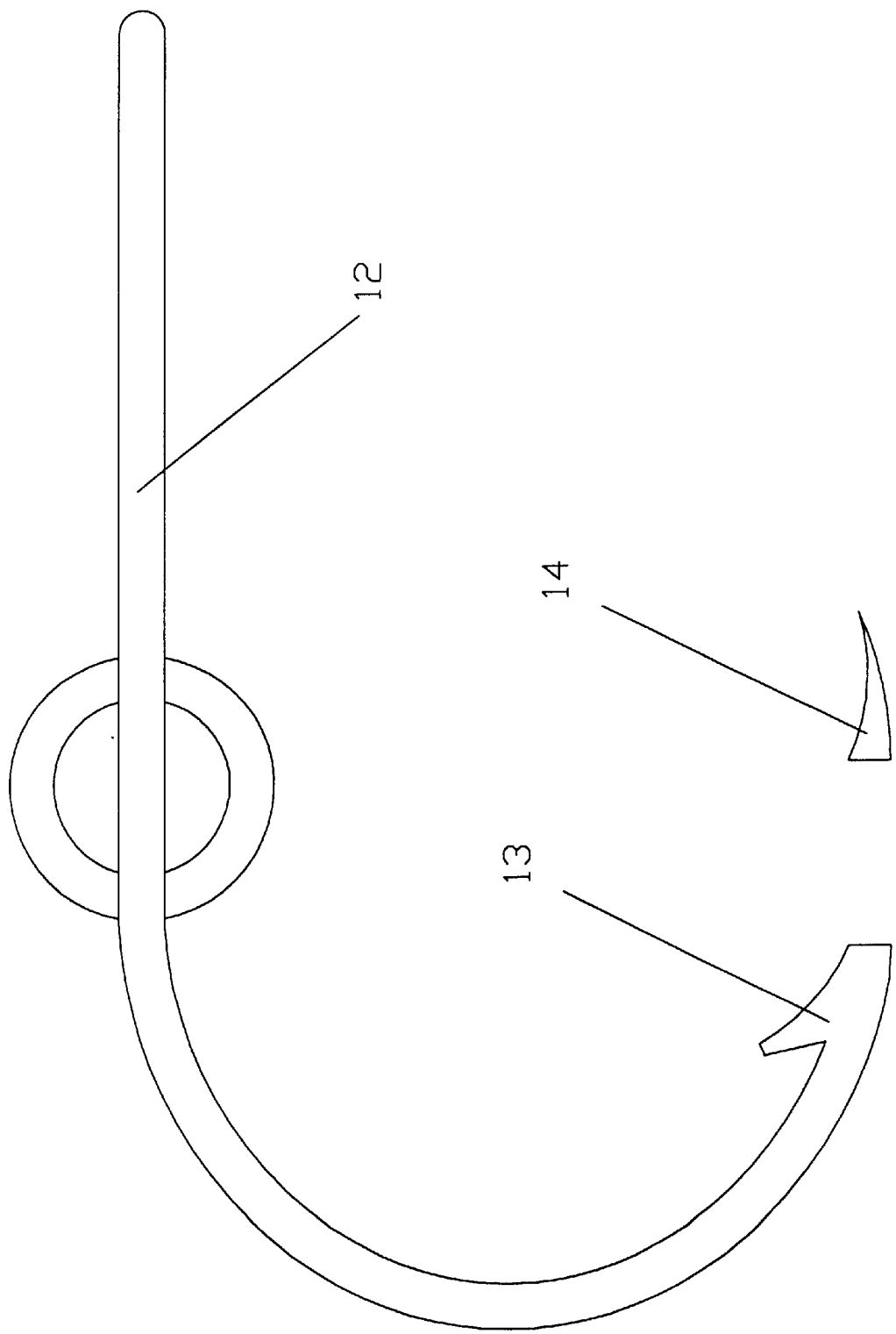
FIG. 4. is is a top perspective view of a bent fishing hook showing the tip of the barb cut off in accordance with the invention.
Figure 5:
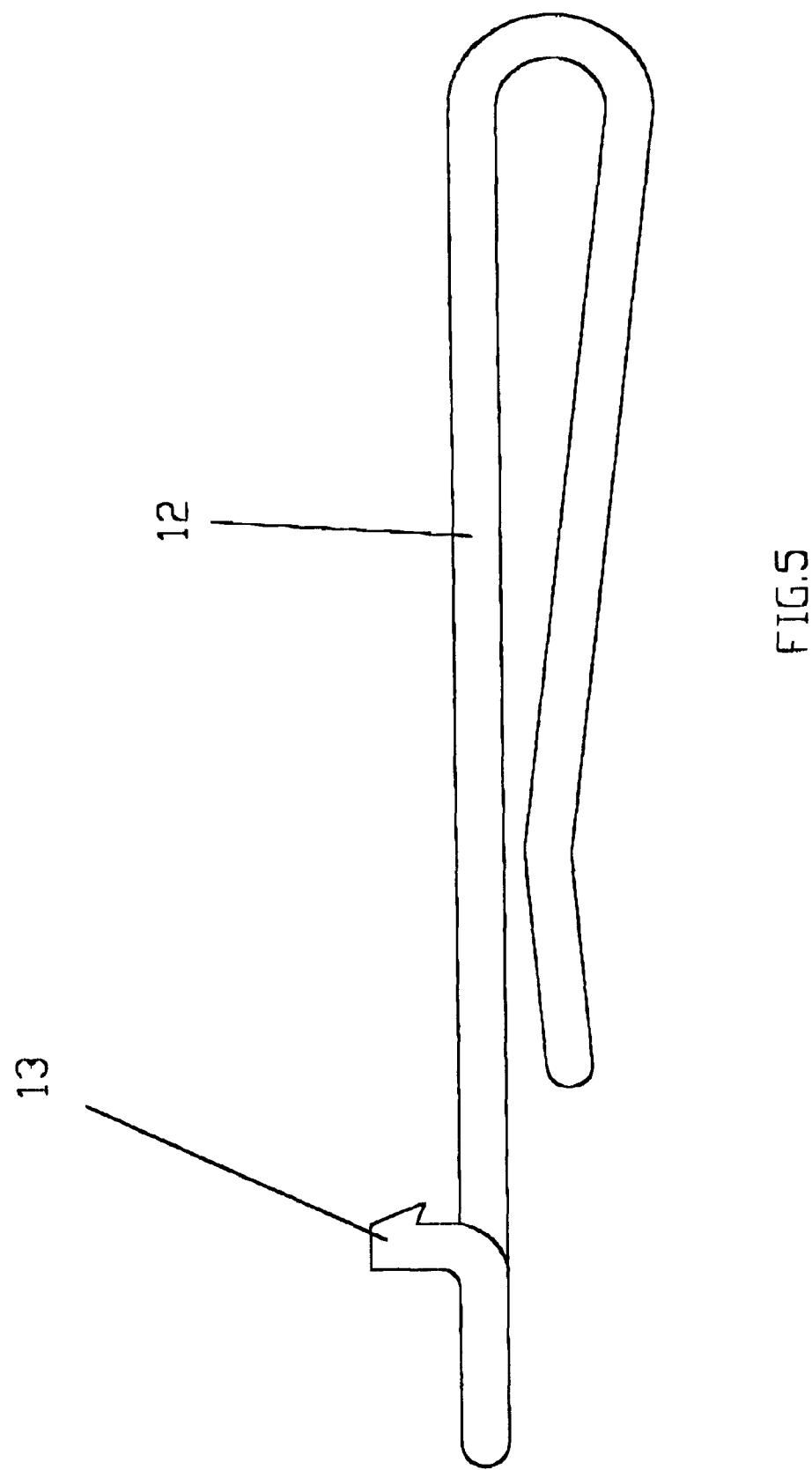
FIG. 5. is a side perspective view of a bent fishing hook with the barbed end bent at 90° in accordance with the invention.

The original shaped bent fishhook 12 is shown in three views in FIGS. 1–3. The fishhook 12 is formed by bending back over the shaft 12' to provide a gripping space 12". The bent hook 12 as shown, may be clipped to a hat bill (not shown) or clipped to a tie (not shown). Modification of the fishhook 12 is shown in FIGS. 4 and 5. The point 14 is cut off just above the barb 13 as shown in FIG. 4. The fishhook 12 is heated at a point 16 prior to bending to remove the hardness of the steel to permit bending without snapping off and the barb 13 is then bent upwardly 90° at point 16 approximately 3/16" from the barb 13.

Figure 6:
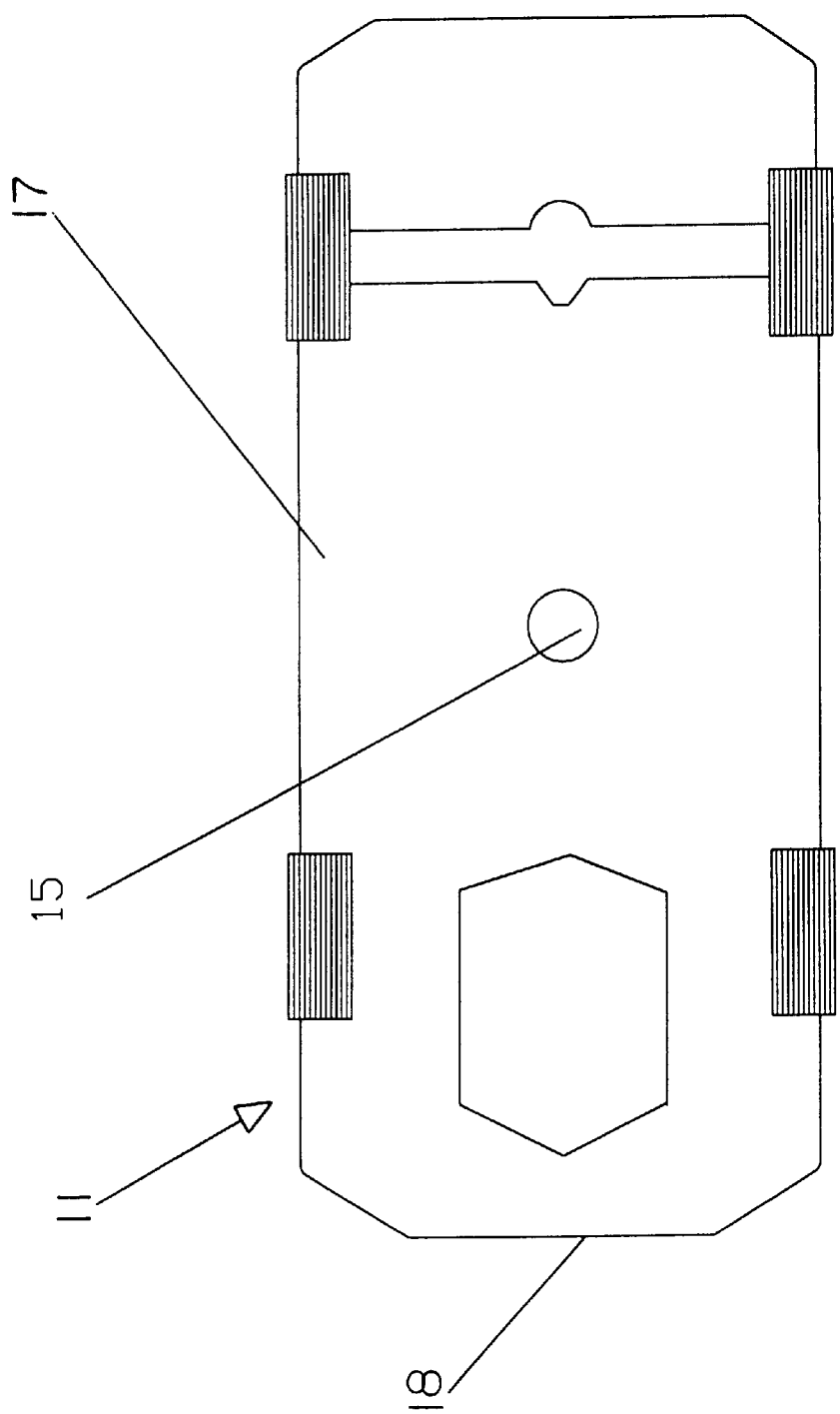
FIG. 6. is a bottom view, of the miniature race card in accordance with the invention.
Figure 7:
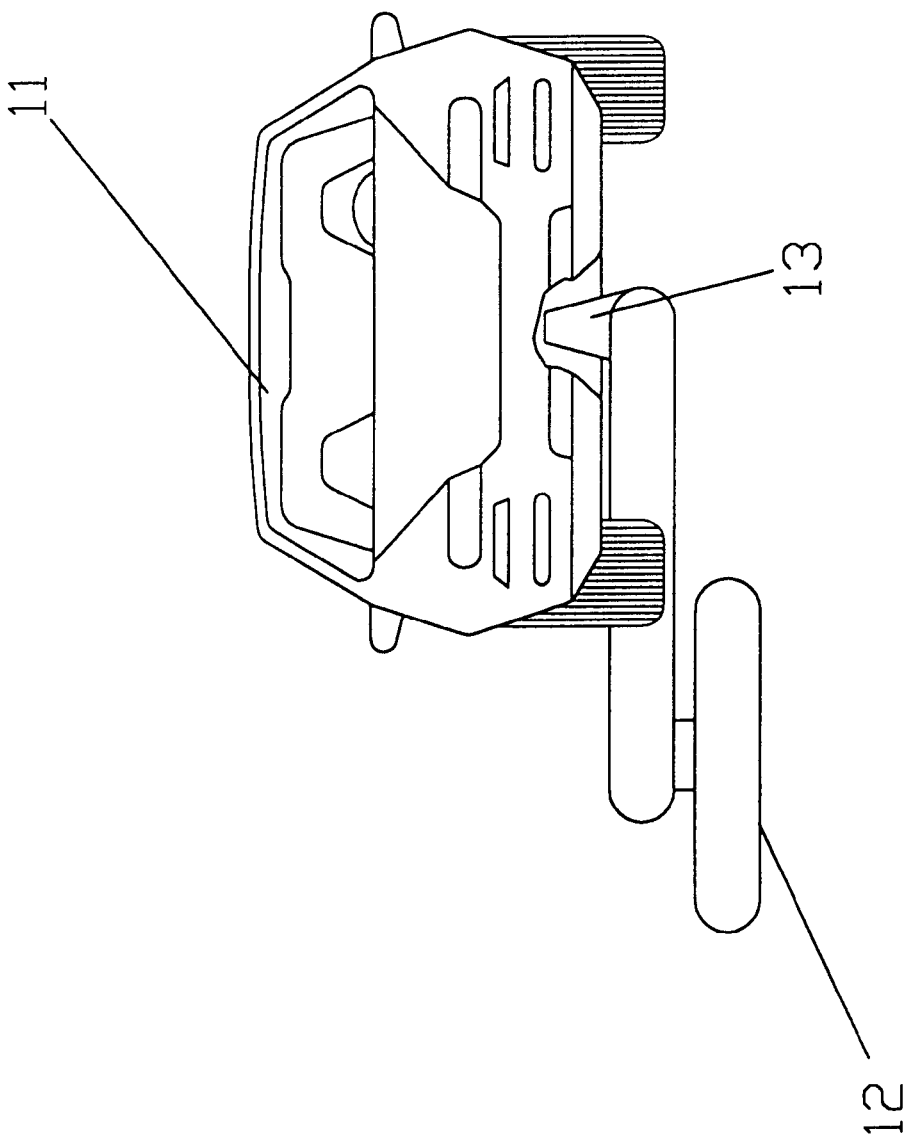
FIG. 7. is a front perspective view, partially in section, of the race car mounted on the bent fishhook in accordance with the invention.
Figure 8:
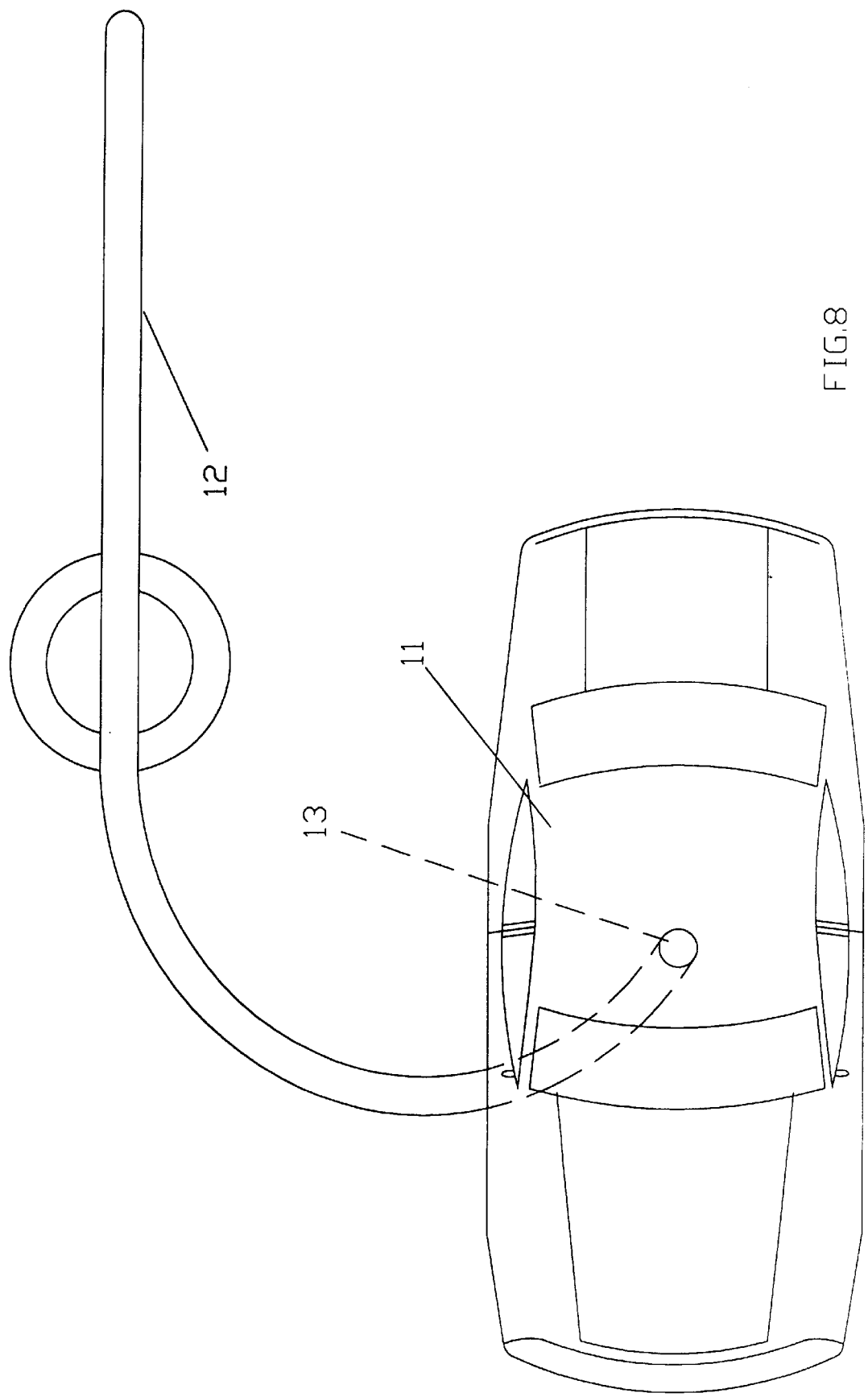
FIG. 8 is a top perspective view of the race car mounted on the bent fishhook in accordance with the invention.

FIG. 6 shows the bottom 17 of a die cast replica of a miniature race car 11 (1:144). A hole 15 (3/16" or 7/64") is drilled in the bottom 17 approximately 3/4" from the front 18. The modified fishhook 12 is then inserted through the hole 15 until the barb 13 is fully inserted into the interior of the die cast race car 11 and held inside by the barb 13. The bottom 17 is then free to revolve around the area of the modified barb 13 thereby preventing removal of the bottom 17. The hole 18 is sized approximately for the modified barb 13 to slide through the hole 18 with a slight bending of the barb 13 which returns to its original positions after passing through the hole 18. After the fishhook 12 and the die cast race car 11 are assembled, the position of the race car 11 may be altered by merely rotating the race car 11 to the desired position.

Although the invention has been described as being used to mount a die cast race car, other sports memorabilia may also be mounted on the modified hook 12. For example, a golf bag or other piece of golf equipment, or a hockey stick, or a basketball etc.

Thus it will be appreciated that the present invention provides a novelty device consisting of a modified fishhook and a die cast racing car which can be mounted on any style baseball cap currently on the market or any tie. It is contemplated that other embodiments and/or modifications may be made in the present invention without departure from inventive concepts manifested by the disclosed embodiments. It is expressly intended, therefore, that the foregoing description is illustrative only of preferred embodiments, not limiting, and that the true spirit and scope of the invention be determined by reference to the appended claims.

What is claimed is:

1. The combination of a modified fishhook and a sports item to form a hat/tie clip, said hat/tie clip consisting of:
    a fishhook having a shaft and a barbed point, said fishhook being modified by bending said shaft and thereby forming a gripping space for gripping a flat object, and a portion of said barbed point being cut off at a point above said barb,
    said shaft being heat treated at a point near said barbed point and being bent upwardly at a 90° angle to said shaft,
    a portion of said point being cut off at a point near said barb, and
    a miniature, die cast replica of a sports item, said sports item having a bottom with a hole formed therein, said sports item being pivotally mounted on said barbed point by inserting said barbed point within said hole formed in said bottom whereby said barb is fully inserted into said sports item and held inside by said barb.

2. The combination of claim 1 wherein said sports item consists of a miniature race car in a ratio of 1:144.

3. The combination of claim 1 wherein said sports item consists of a golf bag.

4. The combination of claim 1 wherein said sports item consists of a hockey stick.

* * * * *